(12) United States Patent
Takeno

(10) Patent No.: US 7,677,076 B2
(45) Date of Patent: Mar. 16, 2010

(54) ANGULAR VELOCITY SENSOR UNIT AND ANGULAR VELOCITY SENSOR DIAGNOSING DEVICE

(75) Inventor: Shoichi Takeno, Fukui (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 11/664,683

(22) PCT Filed: Oct. 6, 2005

(86) PCT No.: PCT/JP2005/018534

§ 371 (c)(1),
(2), (4) Date: Apr. 5, 2007

(87) PCT Pub. No.: WO2006/038669

PCT Pub. Date: Apr. 13, 2006

(65) Prior Publication Data

US 2008/0110259 A1        May 15, 2008

(30) Foreign Application Priority Data

Oct. 7, 2004   (JP) .............................. 2004-294780

(51) Int. Cl.
*G01P 21/00* (2006.01)
(52) U.S. Cl. .......................................... 73/1.37; 701/34
(58) Field of Classification Search .................. 73/1.37, 73/1.77, 504.12, 504.16; 701/34
See application file for complete search history.

(56) References Cited

U.S. PATENT DOCUMENTS

| | | | | |
|---|---|---|---|---|
| 5,969,225 A | * | 10/1999 | Kobayashi | .................. 73/1.37 |
| 6,321,598 B1 | | 11/2001 | Iwaki et al. | |
| 6,360,147 B1 | * | 3/2002 | Lee | .............................. 701/35 |
| 6,462,530 B1 | * | 10/2002 | Layton | ..................... 324/76.49 |
| 7,522,985 B2 | * | 4/2009 | Fiedler et al. | ................. 701/70 |

FOREIGN PATENT DOCUMENTS

| | | |
|---|---|---|
| JP | 2-297067 | 12/1990 |
| JP | 11-51655 | 2/1999 |
| JP | 2000-180178 | 6/2000 |
| JP | 2000-329562 | 11/2000 |

* cited by examiner

*Primary Examiner*—John E Chapman
(74) *Attorney, Agent, or Firm*—Wenderoth, Lind & Ponack, L.L.P.

(57) ABSTRACT

An angular velocity sensor unit judging whether there is a failure in both of two angular velocity sensors. The angular velocity sensor unit includes a first angular velocity sensor (12) and a second angular velocity sensor (13), each including an oscillator having a shaft portion and an oscillatory portion. Each of the angular velocity sensors (12, 13) is arranged such that its shaft portion is not in parallel with an XY-plane defined by an X-axis and a Y-axis of three orthogonal axes. The failure of the second angular velocity sensor is judged based on whether or not a detection value of an angular velocity about a Z-axis lies outside a tolerance range of a detection value of the angular velocity about the Z-axis by the other angular velocity sensor, and the failure of the first angular velocity sensor is judged by comparison with a pseudo-calculated angular velocity.

7 Claims, 6 Drawing Sheets

ANGULAR VELOCITY SENSOR UNIT AND ANGULAR VELOCITY SENSOR DIAGNOSING DEVICE

BACKGROUND OF THE INVENTION

1. Field of the Invention

The present invention relates to an angular velocity sensor unit used in various electronic devices for the posture control, navigation and the like of movable bodies such as airplanes, automobiles, robots, ships and vehicles and an angular velocity sensor diagnosing device to which this angular velocity sensor unit is applied.

2. Description of the Related Art

A conventional angular velocity sensor causes, for example, a tuning fork shaped oscillator to oscillate, in order to electrically detect a strain of the oscillator resulting from a generated Coriolis force, and calculates an angular velocity based on an output from this oscillator. Normally, an angular velocity about one rotary axis can be calculated by one angular velocity sensor.

Oscillators used in angular velocity sensors of this type have various shapes such as tuning fork shapes, H-shapes and T-shapes. For example, as shown in FIG. 6, a tuning fork shaped oscillator 1 is constructed such that a bar-shaped shaft portion 4 is coupled to a U-shaped portion 3 including a pair of arm portions 2.

An arithmetic processing circuit for electrically detecting a strain of the oscillator 1 resulting from a Coriolis force and calculating an angular velocity through arithmetic processing is connected with this oscillator 1.

If such an angular velocity sensor is used, two angular velocity sensors need to be arranged to execute, for example, a vehicle posture control. If three axes orthogonal to each other in a vehicle are assumed to be a yaw axis, a roll axis and a pitch axis, the oscillator 1 of a first angular velocity sensor needs to be arranged such that the shaft portion thereof extends along the yaw-axis direction and the oscillator 1 of a second angular velocity sensor needs to be arranged such that the shaft portion thereof extends along the roll-axis direction.

By this arrangement, an angular velocity about the yaw axis can be calculated from the first angular velocity sensor and the one about the roll axis can be calculated from the second angular velocity sensor. Thus, a vehicle posture with respect to the yaw axis and the roll axis can be understood, enabling the posture control of the vehicle.

A failure judging circuit for judging an occurrence of a failure is provided for the first angular velocity sensor for calculating the angular velocity about the yaw axis. This circuit compares a pseudo-calculated angular velocity based on a vehicle speed, a steering angle of the vehicle, and acceleration and the like with the angular velocity calculated by the first angular velocity sensor, and makes a failure judgment based on a degree of coincidence between the two angular velocities.

For example, patent document 1 is known as prior art document information relating to the invention of this application.

Patent Document 1: Japanese Unexamined Patent Publication No. H02-297067

The above construction has had a problem that no failure judgment can be made for the second angular velocity sensor for calculating the angular velocity about the roll axis although it can be made for the first angular velocity sensor for calculating the angular velocity about the yaw axis.

BRIEF SUMMARY OF THE INVENTION

The present invention aims to solve the above problem and an object thereof is to provide an angular velocity sensor unit capable of making failure judgments for both of two angular velocity sensors.

In order to accomplish the above object, the present invention is directed to an angular velocity sensor unit including at least two angular velocity sensors each having an oscillator having a shaft portion and an oscillatory portion, wherein the two angular velocity sensors are arranged such that the shaft portions thereof are not in parallel with an XY-plane defined by an X-axis and a Y-axis of three orthogonal axes. The failure of one of the two angular velocity sensors is judged based on whether or not a detection value of an angular velocity about a Z-axis lies outside a tolerance range of a detection value of the angular velocity about the Z-axis by the other angular velocity sensor. Further, the failure of the other angular velocity sensor is judged by comparison with a pseudo-calculated angular velocity.

Since the two angular velocity sensors are respectively so arranged as not to be parallel to the XY-plane in the present invention, the angular velocity about the Z-axis can be detected by these two angular velocity sensors. The failure of the other angular velocity sensor can be judged by comparison with the pseudo-calculated angular velocity, and the failure of the one angular velocity sensor can be judged by the comparison of the detection values of the both angular velocity sensors. Accordingly, the failure can be judged for both of the two angular velocity sensors. Further, since it is sufficient to compare the detection values of both of the angular velocity sensors, the failure of the one angular velocity sensor can be judged while suppressing an increase in the number of parts.

According to the present invention, the failure can be judged for the two angular velocity sensors.

DETAILED DESCRIPTION OF THE INVENTION

Hereinafter, embodiments of the invention are described in detail with reference to the accompanying drawings.

Figure 1:
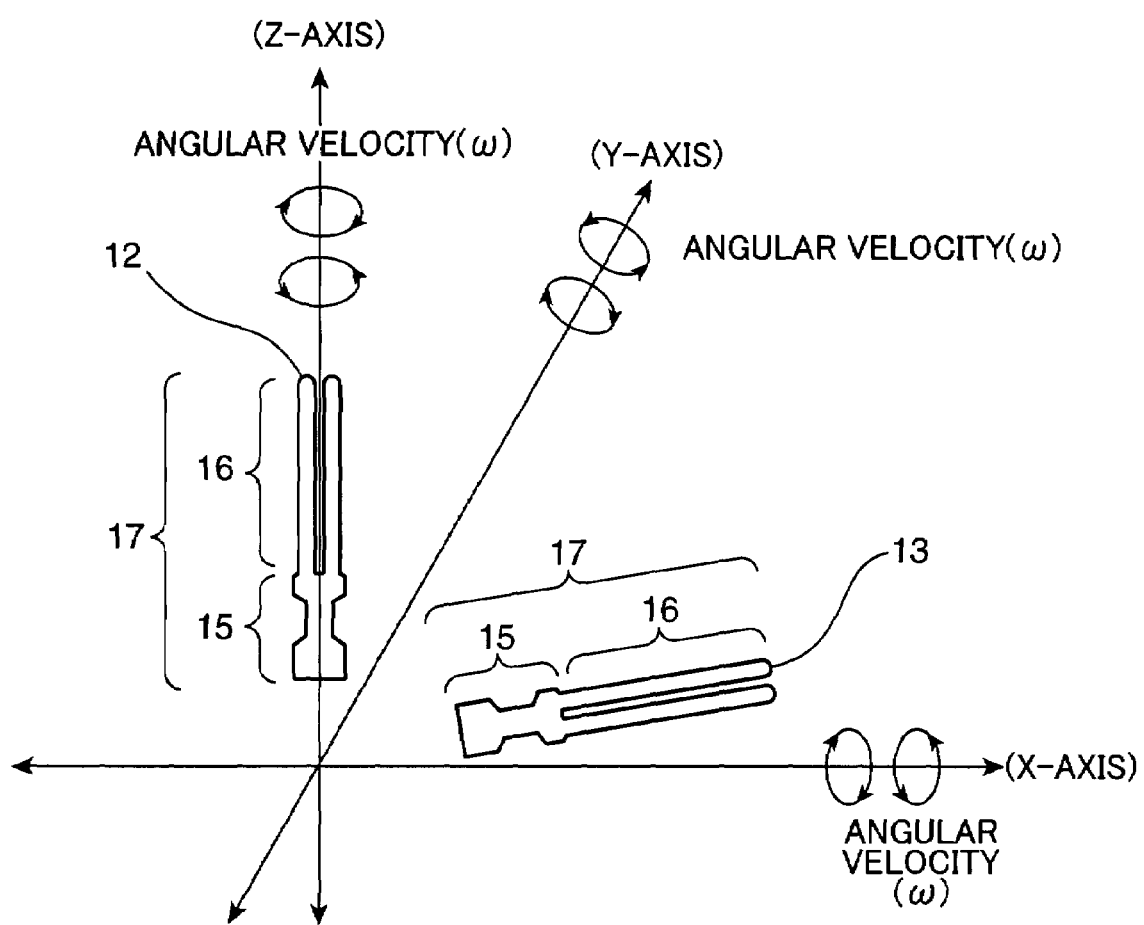
FIG. 1 is a diagram showing an arrangement of oscillators of angular velocity sensors arranged in one embodiment of an angular velocity sensor unit according to the invention.
Figure 2:
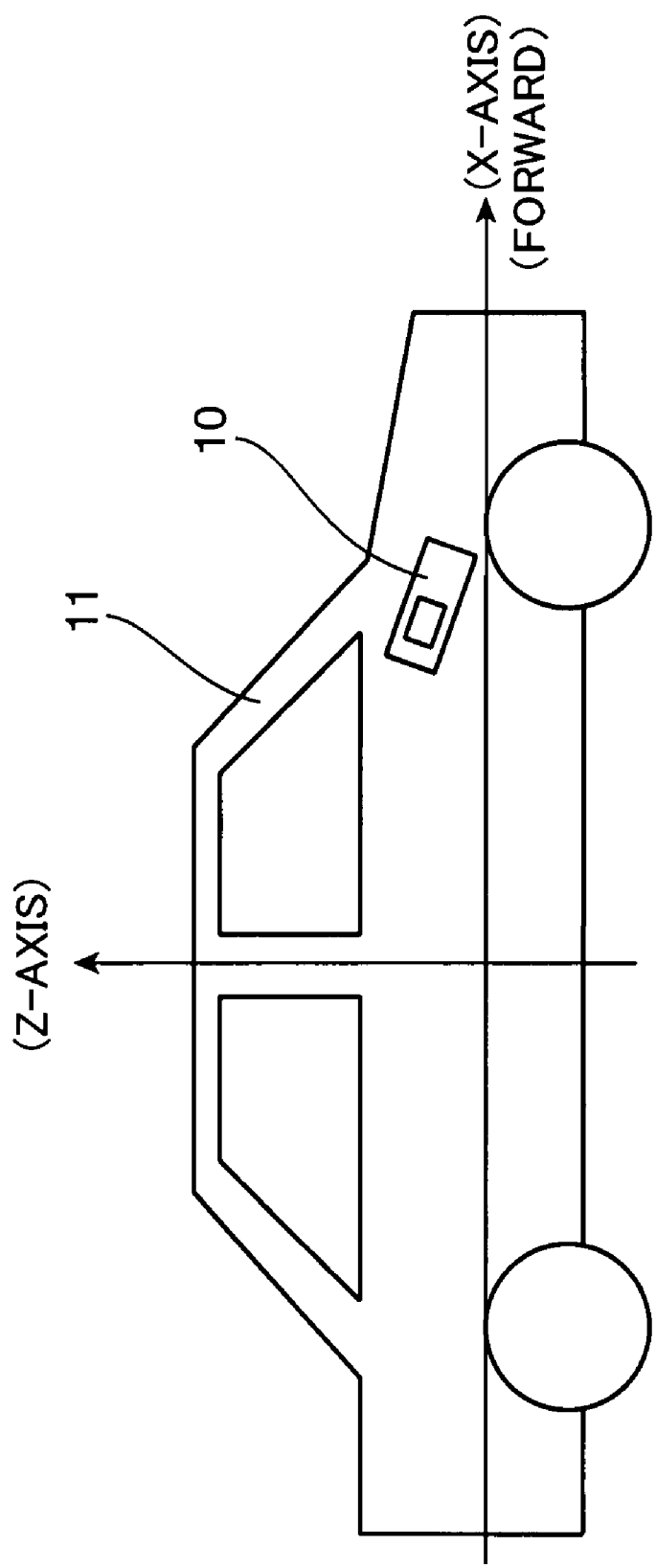
FIG. 2 is a schematic diagram showing a vehicle equipped with the angular velocity sensor unit.
Figure 3:
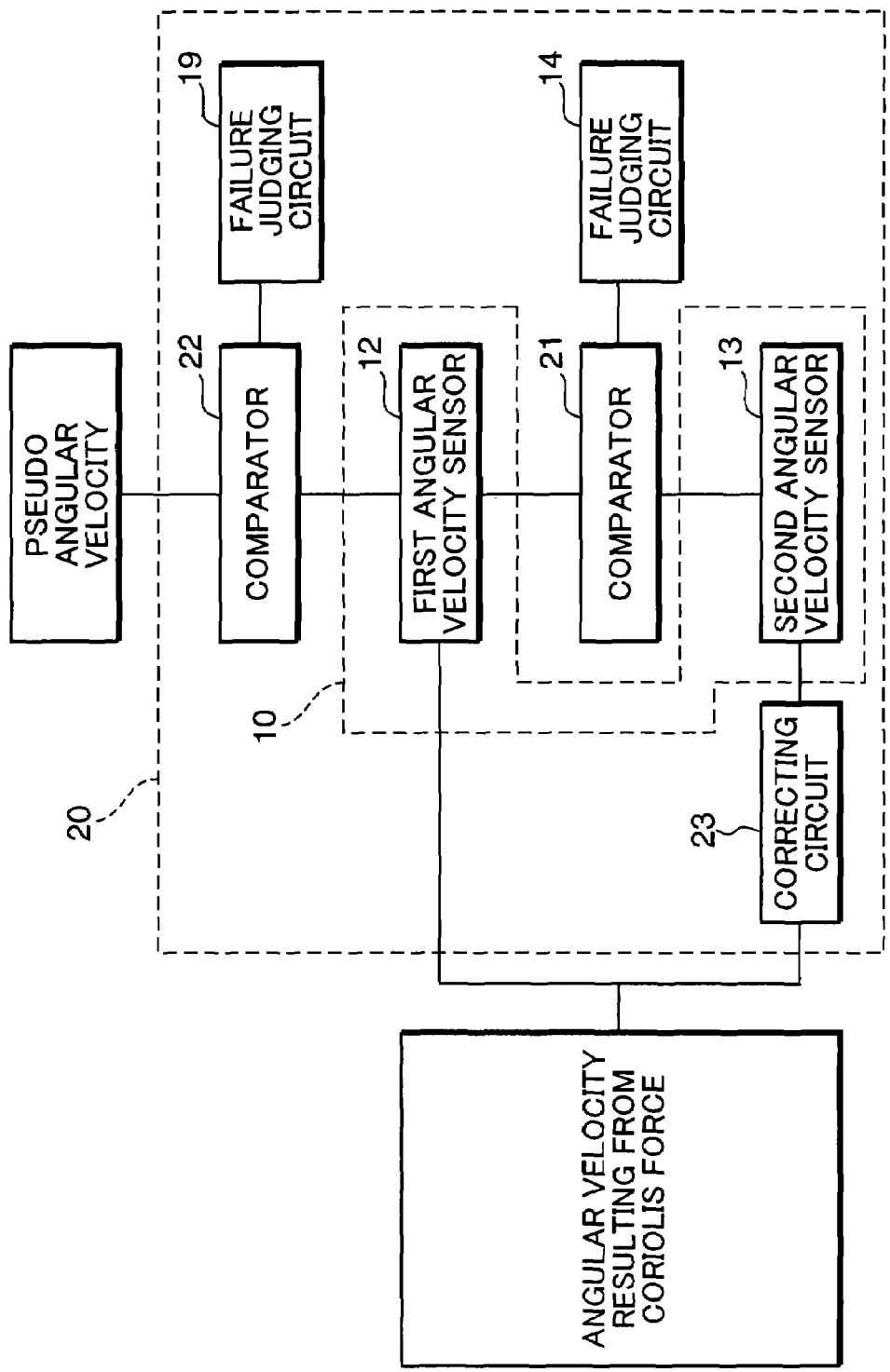
FIG. 3 is a block diagram of an angular velocity sensor diagnosing device including the angular velocity sensor unit.
Figure 4:
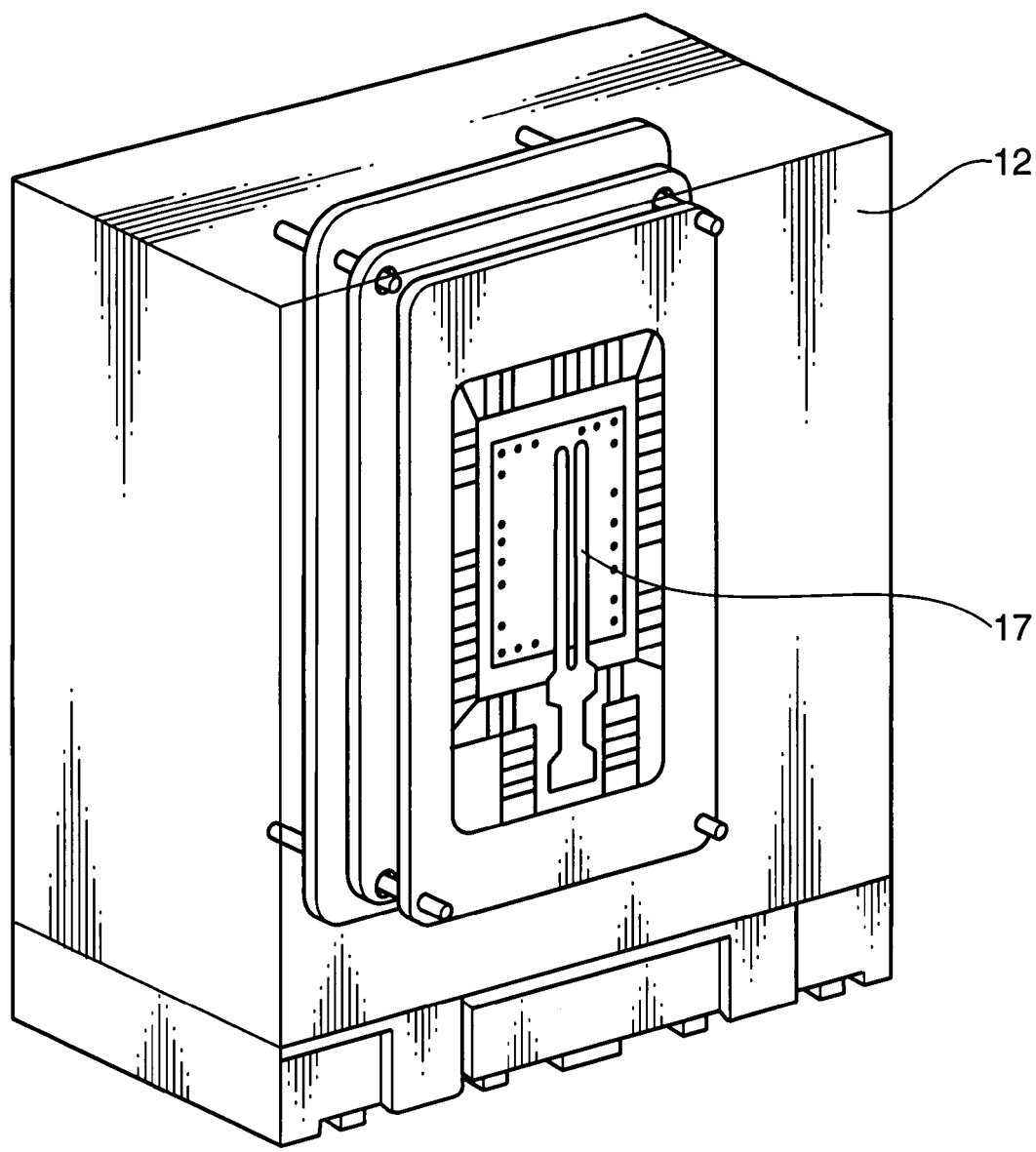
FIG. 4 is a perspective view of the angular velocity sensors installed in the angular velocity sensor unit.

FIG. 1 is a diagram showing an arrangement of oscillators of angular velocity sensors arranged in one embodiment of an angular velocity sensor unit according to the invention, FIG. 2 is a schematic diagram showing a vehicle equipped with the angular velocity sensor unit, FIG. 3 is a block diagram of an angular velocity sensor diagnosing device including the angular velocity sensor unit, and FIG. 4 is a perspective view of a first and a second angular velocity sensors installed in the angular velocity sensor unit.

As shown in FIGS. 1 to 4, an angular velocity sensor diagnosing device 20 according to the embodiment of the present invention is provided with an angular velocity sensor unit 10, a first failure judging circuit 14, a second failure judging circuit 19, a first comparator 21, a second comparator 22 and a correcting circuit 23.

The angular velocity sensor unit 10 is used for detection in a posture control of a vehicle 11 or the like, and includes a first angular velocity sensor 12 and a second angular velocity sensor 13. Whether or not the second angular velocity sensor 13 has a failure is judged by the first failure judging circuit 14, whereas whether or not the first angular velocity sensor 12 has a failure is judged by the second failure judging circuit 19. The first comparator 21 is disposed between the second angular velocity sensor 13 and the first failure judging circuit 14, and the second comparator 22 is disposed between the first angular velocity sensor 12 and the second failure judging circuit 19.

The first and second angular velocity sensors 12, 13 are of the same type, and each of them includes an oscillator 17 having a tuning fork shape. The oscillator 17 is comprised of a shaft portion 15 and a pair of arm portions 16 extending from an end of the shaft portion 15 with respect to longitudinal direction and serving as an oscillatory portion. The angular velocity sensors 12, 13 are each constructed to give an output corresponding to oscillation when the arm portions 16 oscillate.

Here, it is assumed that a yaw axis, a roll axis and a pitch axis of the vehicle 11 are a Z-axis, an X-axis and a Y-axis, the X-, Y-, Z-axes being substantially orthogonal to each other. The first angular velocity sensor 12 is for detecting an angular velocity about the Z-axis (about the yaw axis), and the second angular velocity sensor 13 is for detecting an angular velocity about the X-axis (about the roll axis).

Each of the first and second angular velocity sensors 12, 13 is arranged such that the shaft portion 15 thereof is not in parallel with an XY-plane defined by the X-axis and Y-axis. In other words, the shaft portions 15 of the first and second angular velocity sensors 12, 13 are arranged oblique to the XY-plane.

The oscillators 17 mounted in both angular velocity sensors 12, 13 are arranged in an XZ-plane defined by the X-axis and Z-axis. The oscillator 17 provided in the first angular velocity sensor 12 is arranged such that the shaft portion 15 thereof is parallel to Z-axis direction (direction orthogonal to the XY-plane), and the oscillator 17 mounted in the second angular velocity sensor 13 is arranged such that the shaft portion 15 thereof is oblique both to the X-axis and Z-axis. More specifically, the second angular velocity sensor 13 is inclined at about several degrees toward the Z-axis in the XZ-plane. The direction of the shaft portion 15 of each of these angular velocity sensors 12, 13 is known.

The second comparator 22 compares a pseudo angular velocity pseudo-calculated by an unillustrated sensor mounted in the vehicle 11 with an angular velocity detected by the first angular velocity sensor 12. Here, the pseudo angular velocity can be derived from a speed of the vehicle 11, a steering angle of the vehicle 11, acceleration and the like.

The second failure judging circuit 19 judges the failure of the first angular velocity sensor 12 based on the comparison result by the second comparator 22. In other words, the failure of the first angular velocity sensor 12 is judged if a difference between the pseudo angular velocity and the angular velocity detected by the first angular velocity sensor 12 lies outside a specified range.

The first comparator 21 compares a detection value of the angular velocity about the Z-axis by the first angular velocity sensor 12 with a detection value of the angular velocity about the Z-axis by the second angular velocity sensor 13.

The first failure judging circuit 14 judges the failure of the second angular velocity sensor 13 if a difference of two detection values lies outside a tolerance range as a result of the comparison of the detection values of both angular velocity sensors 12, 13 by the first comparator 21.

As mentioned above, the shaft portion 15 of the oscillator 17 mounted in the first angular velocity sensor 12 is arranged in Z-axis direction, whereas that of the oscillator 17 mounted in the second angular velocity sensor 13 is arranged in a direction inclined by several degrees from X-axis direction toward Z-axis direction. Thus, a Coriolis force generated in the oscillator 17 mounted in the second angular velocity sensor 13 is weaker than the one generated in the oscillator 17 mounted in the first angular velocity sensor 12. Accordingly, the second angular velocity sensor 13 detects the angular velocity about the Z-axis after correcting such a difference between the Coriolis forces resulting from the arrangement difference in the correcting circuit 23. Thus, if the angular velocity about the Z-axis detected by the second angular velocity sensor 13 lies outside the detection tolerance range of the angular velocity about the Z-axis detected by the first angular velocity sensor 12, the failure of the second angular velocity sensor 13 can be judged.

As described above, the angular velocity about the Z-axis can be detected by both angular velocity sensors 12, 13 since the two angular velocity sensors 12, 13 are respectively so disposed as not to be parallel to the XY-plane. The failure of the first angular velocity sensor 12 can be judged by comparison with the pseudo-calculated angular velocity. The failure of the second angular velocity sensor 13 can be judged if the angular velocity about the Z-axis detected by the second angular velocity sensor 12 lies outside the detection tolerance range of the angular velocity about the Z-axis detected by the first angular velocity sensor 12. Therefore, the failure of the second angular velocity sensor 13 for calculating the angular velocity about the roll axis can be judged utilizing the first angular velocity sensor 12 for calculating the angular velocity about the yaw axis. Further, since it is sufficient to compare the detection values of both angular velocity sensors 12, 13, the failure of the second angular velocity sensor 13 can be judged while suppressing an increase in the number of parts.

Here, characteristic features of this embodiment are described.

(1) Both angular velocity sensors are arranged such that the shaft portions thereof lie in the XZ-plane defined by the X-axis and Z-axis. Accordingly, the failure of the angular velocity sensors capable of detecting the angular velocity about the Z-axis can be judged.

(2) The Z-axis is the yaw axis of the movable body, the X-axis is the roll axis thereof and the Y-axis is the pitch axis thereof. Accordingly, the failure of the angular velocity sensor for detecting the angular velocity about the yaw axis of the movable body can be judged.

(3) Both of the angular velocity sensors are arranged in the plane defined by the yaw axis and the roll axis, wherein one of these angular velocity sensors is arranged oblique to the roll axis and the other thereof is arranged in parallel with the yaw-axis. Accordingly, the angular velocity about the yaw-axis of the movable body can be precisely detected by the other angular velocity sensor while judgment on the failure of the angular velocity sensors is enabled.

(4) The angular velocity sensor unit is mounted in the vehicle. Accordingly, the failure of the sensors for detecting the angular velocities about the yaw-axis and the roll-axis of the vehicle can be judged.

(5) The angular velocity sensor diagnosing device is provided with the angular velocity sensor unit including at least two angular velocity sensors each having the oscillator comprised of the shaft portion and the oscillatory portion, the angular velocity sensors being arranged such that the shaft portions thereof are not in parallel with the XY-plane defined by the X-axis and Y-axis of three axes orthogonal to each other. The first failure judging circuit is for judging the failure of the one angular velocity sensor based on whether or not the detection value of the angular velocity about the Z-axis by the one angular velocity sensor lies outside the tolerance range of the detection value of the angular velocity about the Z-axis by the other angular velocity sensor. Further, the second failure judging circuit is for judging the failure of the other angular velocity sensor by comparison with the pseudo-calculated angular velocity. Accordingly, the failure of the other angular velocity sensor can be judged by the second failure judging circuit, and the failure of the one angular velocity sensor can be judged by the first failure judging circuit by the comparison of the detection values of the both angular velocity sensors. Therefore, the failures of both of two angular velocity sensors can be judged.

Figure 5:
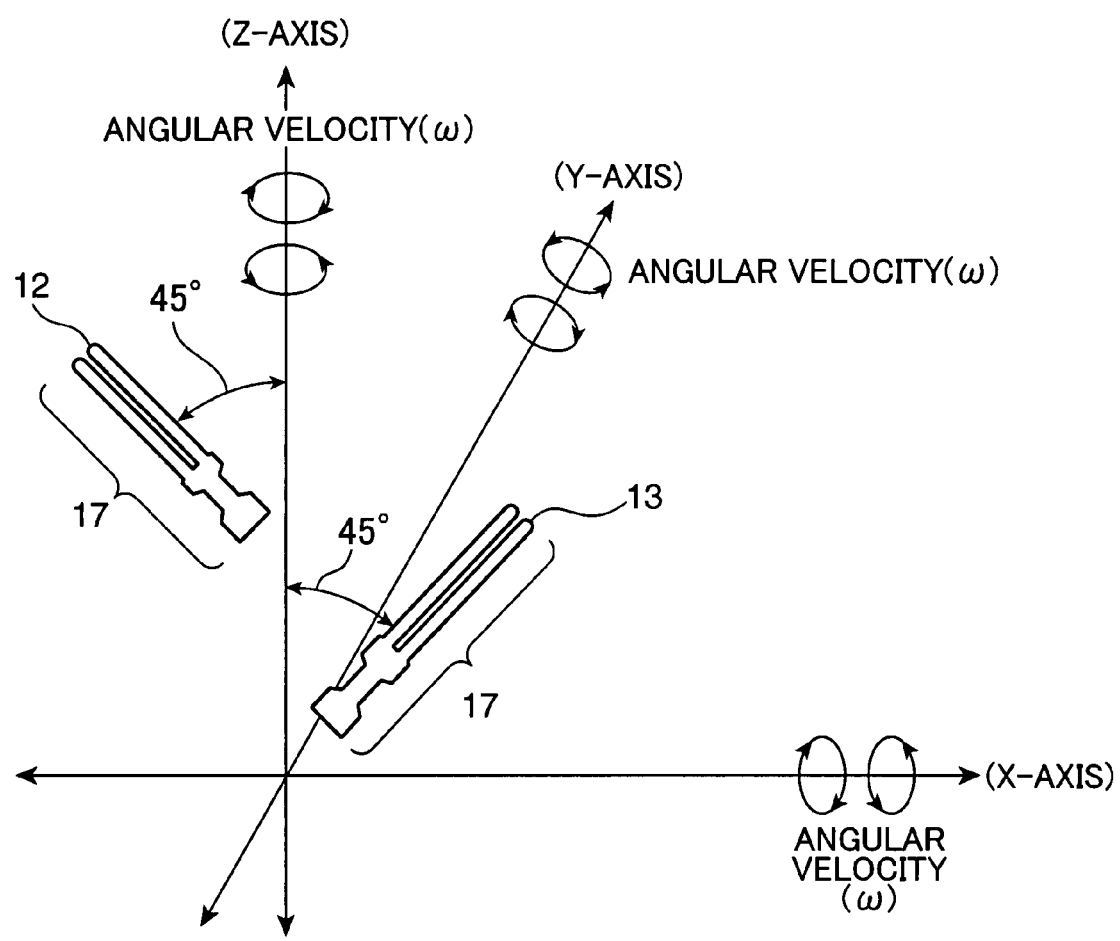
FIG. 5 is a diagram showing an arrangement of oscillators of angular velocity sensors arranged in an angular velocity sensor unit according to another embodiment of the invention.
Figure 6:
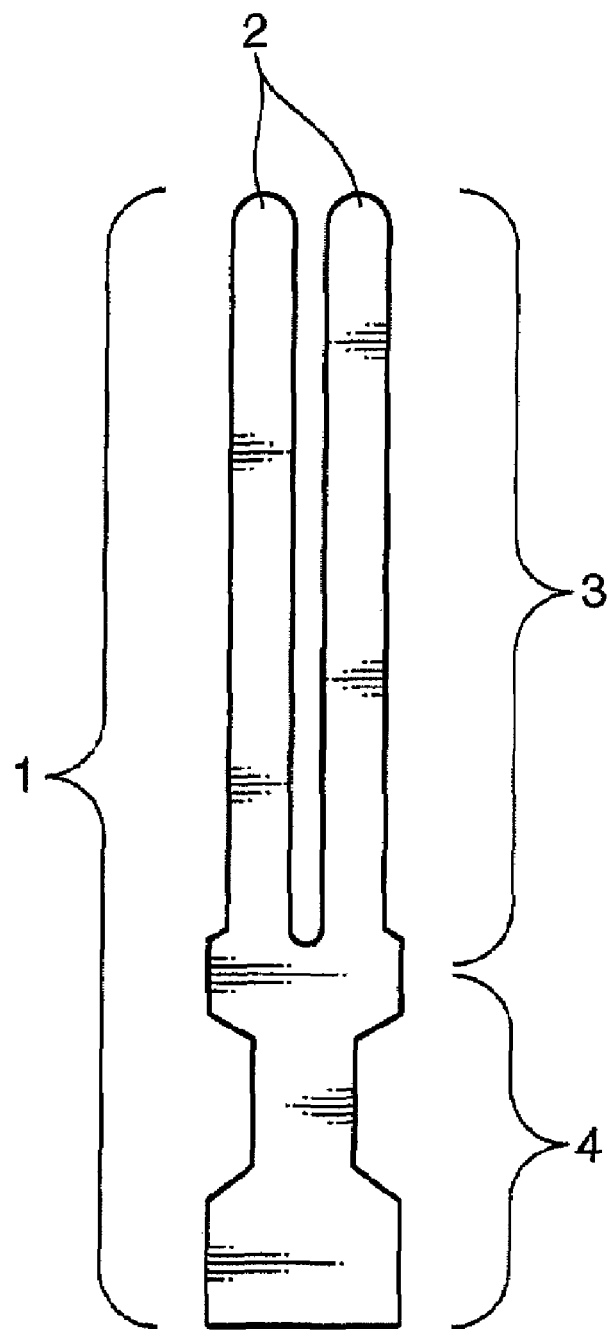
FIG. 6 is a front view showing an oscillator of a conventional angular velocity sensor.

The oscillator 17 of the first angular velocity sensor 12 and the oscillator 17 of the second angular velocity sensor 13 may be arranged in the XZ-plane defined by the X-axis and Z-axis such that the extending directions of the shaft portions 15 of both oscillators 17 are orthogonal to each other. By such an arrangement, the tolerance range can be more easily set. In this case, the shaft portions 15 of the oscillators 17 may be inclined in opposite directions by 45° with respect to the Z-axis as shown in FIG. 5. In other words, the both angular velocity sensors may be arranged such that the shaft portions thereof are symmetrically inclined by 45° with respect to the Z-axis.

Besides the tuning fork shape, the oscillators 17 may have an H-shape, a T-shape or one of various other shapes.

As described above, the angular velocity sensor unit of the present invention is applicable to various electronic devices for the posture control, navigation and the like of movable bodies such as airplanes, automobiles, robots, ships and vehicles.

What is claimed is:

1. An angular velocity sensor diagnosing device for use in a movable body, the angular velocity sensor diagnosing device comprising:
    an angular velocity sensor unit including two angular velocity sensors, each of the two angular velocity sensors including a respective oscillator having a shaft portion and an oscillatory portion, the two angular velocity sensors being arranged such that the shaft portion of each respective oscillator is not in parallel with an XY-plane defined by an X-axis and a Y-axis of three orthogonal axes;
    a first failure judging circuit for judging a failure of one angular velocity sensor of the two angular velocity sensors the judgment of the failure of the one angular velocity sensor depending on whether or not a detection value of an angular velocity about a Z-axis detected by the one angular velocity sensor is outside a tolerance range of a detection value of an angular velocity about the Z-axis detected by another angular velocity sensor of the two angular velocity sensors; and
    a second failure judging circuit for judging a failure of the another angular velocity sensor by comparing the detection value of the angular velocity detected by the another angular velocity sensor with an angular velocity calculated by a sensor that is mounted in the movable body and derives the calculated angular velocity from (i) a speed of the movable body, (ii) a steering angle of the movable body, and (iii) acceleration of the movable body.

2. The angular velocity sensor diagnosing device according to claim 1, wherein the two angular velocity sensors are arranged such that the shaft portion of each respective oscillator lies in an XZ-plane defined by the X-axis and the Z-axis.

3. The angular velocity sensor diagnosing device according to claim 2, wherein the two angular velocity sensors are arranged such that extensions of the shaft portions of the respective oscillators are orthogonal to one another.

4. The angular velocity sensor diagnosing device according to claim 3, wherein the two angular velocity sensors are arranged such that the shaft portions of the respective oscillators are symmetrically inclined by 45° with respect to the Z-axis.

5. The angular velocity sensor diagnosing device according to claim 1, wherein the Z-axis is a yaw axis of the movable body, the X-axis is a roll axis of the movable body, and the Y-axis is a pitch axis of the movable body.

6. The angular velocity sensor diagnosing device according to claim 5,
    wherein the two angular velocity sensors are respectively arranged in a plane defined by the yaw axis and the roll axis,
    wherein a first angular velocity sensor of the two angular velocity sensors is arranged oblique to the roll axis, and
    wherein a second angular velocity sensor of the two angular velocity sensors is arranged in parallel with the yaw axis.

7. The angular velocity sensor diagnosing device according to claim 5, wherein the angular velocity sensor unit is mounted on a vehicle.

* * * * *